United States Patent
Kwon et al.

(10) Patent No.: US 8,381,073 B2
(45) Date of Patent: Feb. 19, 2013

(54) SYSTEM-ON-A-CHIP STORING CHIP DATA AND/OR SECURITY DATA AND METHOD OF PROCESSING CHIP DATA AND/OR SECURITY DATA FOR A DEVICE

(75) Inventors: Eui-jin Kwon, Seoul (KR); Oh-sang Kwon, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 534 days.

(21) Appl. No.: 12/623,575

(22) Filed: Nov. 23, 2009

(65) Prior Publication Data

US 2010/0131828 A1 May 27, 2010

(30) Foreign Application Priority Data

Nov. 27, 2008 (KR) ........................ 10-2008-0119009

(51) Int. Cl.
*G06F 11/00* (2006.01)
(52) U.S. Cl. ...................................................... 714/764
(58) Field of Classification Search ........................ None
See application file for complete search history.

(56) References Cited

U.S. PATENT DOCUMENTS

2007/0124653 A1* 5/2007 Conti et al. .................. 714/781
2007/0296403 A1* 12/2007 Mori et al. .................. 324/158.1
2008/0271164 A1* 10/2008 Dellow et al. .................. 726/30

FOREIGN PATENT DOCUMENTS

JP 2002-299561 10/2002

OTHER PUBLICATIONS

W. Tonti, "eFuse Design and Reliability", Integrated Reliability Workshop Final Report, 2008. IRW 2008. IEEE International, Oct. 12-16, 2008, 3 pages.

* cited by examiner

*Primary Examiner* — Michael Maskulinski
(74) *Attorney, Agent, or Firm* — Volentine & Whitt, PLLC (57) ABSTRACT

A system-on-a-chip (SOC) includes a memory system, a data processor and a read only memory (ROM). The memory system includes random access memory and a memory controller. The data processor includes at least one functional block that communicates data with the memory system via the memory controller. The ROM stores data and one or more parity bits for detecting and correcting errors in the data. The data includes chip information and/or security information for the SOC. A method of using the SOC includes storing data in the ROM that includes chip information and/or security information for the SOC; storing in the ROM the one or more parity bits for the data; reading the data and the one or more parity bits from the ROM; detecting and correcting errors in the data using the one or more parity bits; and outputting the corrected data.

9 Claims, 9 Drawing Sheets

SYSTEM-ON-A-CHIP STORING CHIP DATA AND/OR SECURITY DATA AND METHOD OF PROCESSING CHIP DATA AND/OR SECURITY DATA FOR A DEVICE

CROSS-REFERENCES TO RELATED APPLICATIONS

This application claims priority under 35 U.S.C. §119 from Korean Patent Application 2008-0119009, filed on 27 Nov. 2008 in the names of Kwon EuiJin et al., the entirety of which is hereby incorporated by reference for all purposes as if fully set forth herein.

BACKGROUND

1. Field

This disclosure pertains to the field of system-on-a-chip integrated circuit devices, and more particularly, to a system-on-a-chip storing chip data and/or security data for the chip, and a method of processing chip data and/or security data for a system-on-a-chip.

2. Description

System-on-a-chip or system on chip (SOC) refers to integrating all components of a computer or other electronic system into a single integrated circuit (chip). An SOC may contain digital, analog, mixed-signal, and often radio-frequency functions—all on one chip. A typical application is in the area of embedded systems. In general an SOP includes a number of functional blocks. These functional blocks are typically realized as intellectual property (IP) blocks or cores.

An IP block, or IP core, is a reusable unit of logic, cell, or chip layout design that is also the intellectual property of one party. IP cores may be licensed to another party or can also be owned and used by a single party alone. The term is derived from the licensing of the patent and copyright intellectual property rights that subsist in the design. IP cores can be used as building blocks within application-specific integrated circuit (ASIC) or field programmable gate array (FPGA) designs. Ideally, an IP core should be portable—that is, able to easily be inserted into any vendor technology or design methodology. An IP core may be a hard core, a firm core, or a soft core. IP cores in the electronic design industry have had a profound impact on the design of SOCs.

Figure 1:
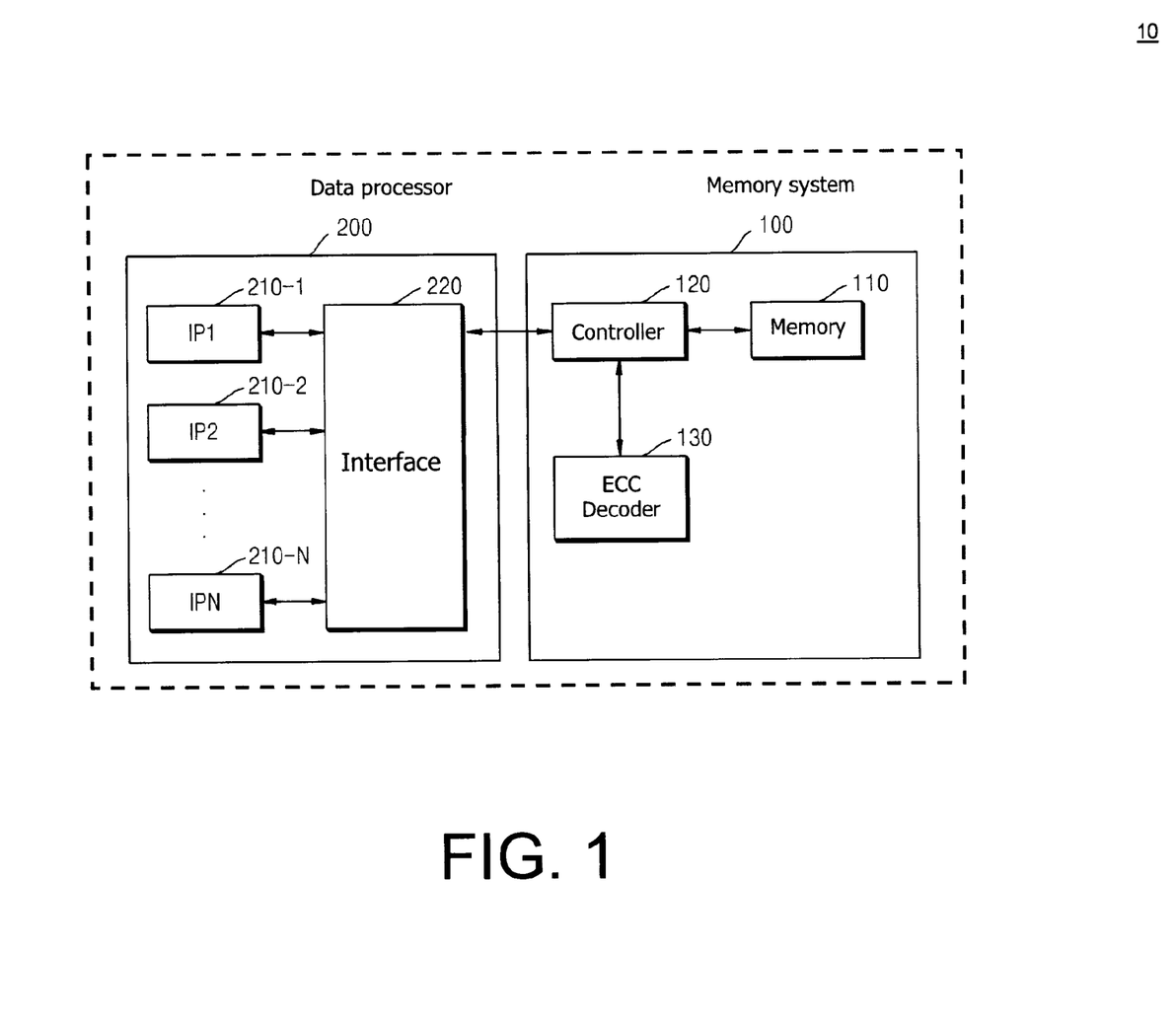
FIG. 1 illustrates an example of a system-on-a-chip (SOC).

FIG. 1 illustrates an example of a system-on-a-chip (SOC) 10. SOC 10 includes memory system 100 and data processor 200. Memory system 100 includes memory 110, memory controller 120, and error correction code (ECC) decoder 130. Data processor 200 includes a plurality of functional blocks 210-1~210-N and an interface 220 for communicating data between data processor 200 and memory system 100.

Memory 110 stores user data generated or processed by data processor 200 and its functional blocks 210-1~210-N during operations of SOC 10, under control of memory controller 120. ECC decoder 130 performs an error correction code decoding operation for user data or application data when it is communicated from memory system 100 to data processor 200.

Each of the functional blocks 210-1~210-N includes logic and/or data to perform one or more operations of SOC 10.

In many cases, SOC 10 has certain chip information and/or security information for the SOC stored therein. This information may include a variety of data, including for example, a chip identification number, a chip version number, a chip security code, etc. Chip information and security information for the SOC should be distinguished from user data or application data generated and/or processed by data processor 200 and its functional blocks 210-1~210-N during operations of SOC 10.

In general, this data is stored in a read only memory (ROM) of SOC 10, which is generally a one-time programmable ROM, such as an E-Fuse ROM. The chip information and/or security information for SOC 10 is fixed in the ROM during the chip manufacturing process.

However, a problem occurs sometimes such that there is a malfunction or failure in the process of storing the chip information and/or security information for SOC 10 in the ROM, such that the correct data is not stored, or is stored in poor quality. This reduces the manufacturing yield for SOC 10.

Accordingly, it would be desirable to provide a system-on-a-chip (SOC) that is able to recover from a defect or malfunction in storing chip information and/or security information for the SOC during the manufacturing process. It would be further desirable to provide a method of operating a SOC when errors occur while storing in an SOC chip information and/or security information for the SOC during the manufacturing process.

SUMMARY

The present disclosure is directed to a system-on-a-chip (SOC), and a method of processing chip data and/or security data for an SOC.

In one aspect of the inventive concept, a method comprises: storing in a read only memory (ROM) of a system-on-a-chip (SOC) first data comprising at least one of chip information and security information for the SOC; storing in the ROM one or more parity bits for the first data; reading the first data and the one or more parity bits from the ROM; detecting and correcting errors in the first data using the one or more parity bits; and outputting the corrected first data.

In another aspect of the inventive concept, a method is provided for a system-on-a-chip (SOC) comprising a memory system and a data processor, the memory system including random access memory, a memory controller, and an error correction code (ECC) decoder, and the data processor including at least one functional block that communicates data with the memory system via the memory controller. The method comprises: storing in a read only memory (ROM) of the memory system first data comprising at least one of chip information and security data for the SOC; storing in the ROM one or more parity bits for the first data; reading the first data and the one or more parity bits from the ROM; writing the data and the one or more parity bits into a first register in the memory system; employing the ECC decoder in the memory system to detect and correct errors in the first data using the one or more parity bits; writing the corrected first data into a second register in the memory system; and communicating the corrected first data from the memory system to the data processor.

In yet another aspect of the inventive concept, a method is provided for a system-on-a-chip (SOC) comprising a memory system and a data processor, the memory system including random access memory and a memory controller, and the data processor including at least one functional block that communicates data with the memory system via the memory controller and an error correction code (ECC) decoder. The method comprises: storing in a read only memory (ROM) of the memory system first data comprising at least one of chip information and security data for the SOC; storing in the ROM one or more parity bits for the first data; reading the first data and the one or more parity bits from the ROM; communicating the first data and the one or more parity bits from the memory system to the data processor; writing the data and the one or more parity bits into a first register in the data processor; employing the ECC decoder in the data processor to detect and correct errors in the first data using the one or more parity bits; and writing the corrected first data into a second register the data processor.

In still another aspect of the inventive concept, a method comprises: reading first data and one or more parity bits from a read only memory (ROM) of a system-on-a-chip (SOC), the first data comprising at least one of chip information and security information for the SOC; detecting and correcting errors in the first data using the one or more parity bits using an error correction code (ECC) decoder included in the SOC; and outputting the corrected first data.

In a further aspect of the inventive concept, a method comprises: providing a system-on-a-chip (SOC) comprising a memory system and a data processor, the memory system including random access memory and a memory controller, and the data processor including at least one functional block that communicates data with the memory system via the memory controller; providing a read only memory (ROM) in the memory system of the SOC; storing in the ROM first data comprising at least one of chip information and security information for the SOC; and storing in the ROM one or more parity bits for detecting and correcting errors in the first data.

In yet a further aspect of the inventive concept, a device comprises: a system-on-a-chip (SOC), including: a memory system including random access memory and a memory controller, and a data processor including at least one functional block that communicates data with the memory system via the memory controller; a read only memory (ROM) in the memory system of the SOC, the ROM storing first data comprising at least one of chip information and security information for the SOC and one or more parity bits for detecting and correcting errors in the first data.

DETAILED DESCRIPTION OF THE EMBODIMENTS

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Beneficially, an SOC may store chip information and/or security information for the SOC in a read only memory (ROM) of SOC, which is generally a one-time programmable ROM, such as an E-Fuse ROM. The chip information and/or security information for the SOC is fixed in the ROM during the chip manufacturing process. Beneficially, in one or more embodiments as discussed in more detail below, when an SOC stores the chip information and/or security information for the SOC in the ROM, it also stores in the ROM one or more parity bits for the chip information and/or security information. Subsequently, when the chip information and/or security information for the SOC is read from ROM, then the corresponding parity bit(s) are also read from the ROM, and the chip information and/or security information for the SOC and the corresponding parity bit(s) are provided together to an error correction code (ECC) decoder. The ECC decoder then corrects any errors in the chip information and/or security information for the SOC and outputs the corrected chip information and/or security information for the SOC—for example to a requesting functional block of a data processor section of the SOC. Accordingly, if there is a malfunction or failure in the process of storing the chip information and/or security information for the SOC in the ROM, such that the correct data is not stored, or is stored in poor quality, then one or more errors in the data may be corrected, and the SOC will still be operable.

Figure 2:
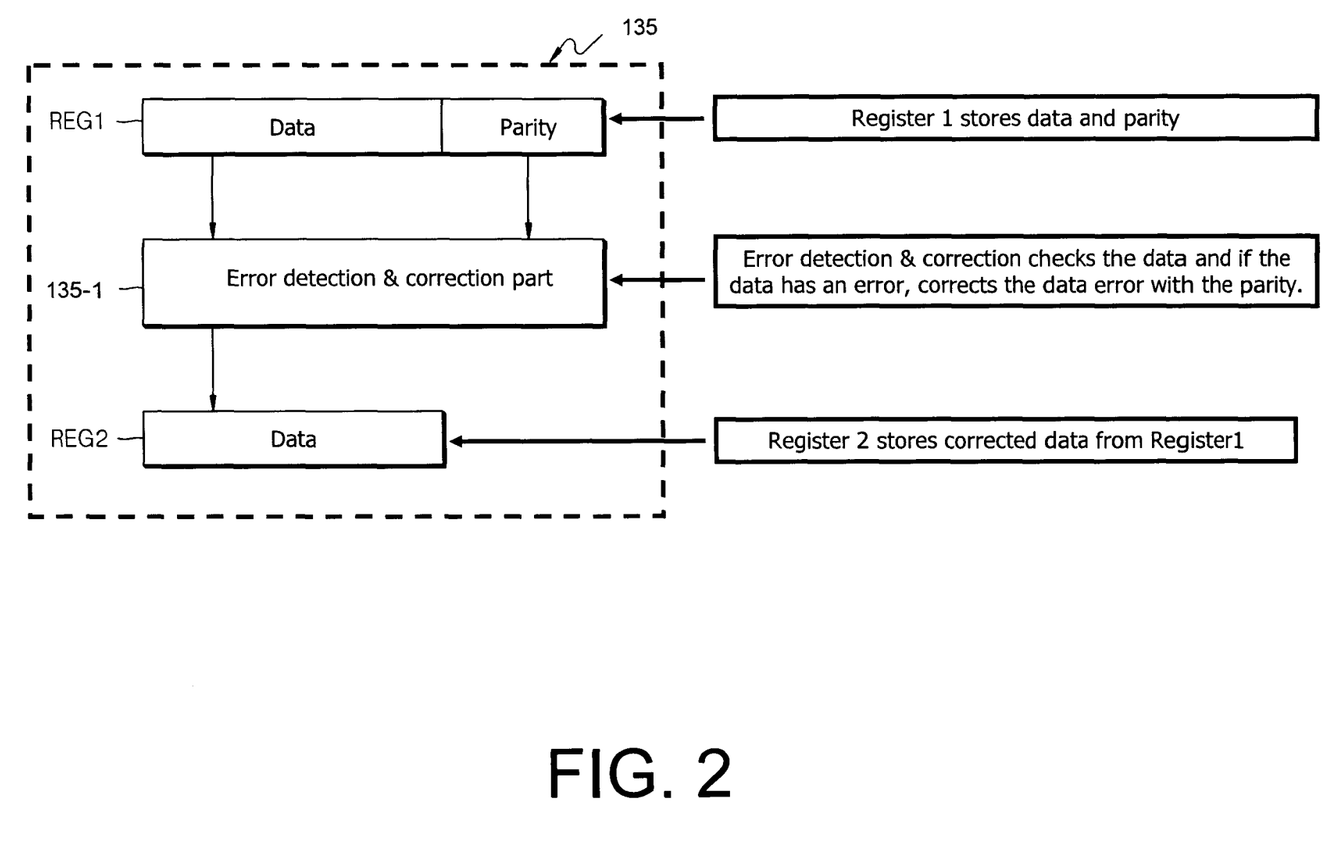
FIG. 2 illustrates components of an error correction code (ECC) decoding operation for chip information and/or security information for an SOC.

FIG. 2 illustrates components of an error correction code (ECC) decoding operation for chip information and/or security information for a system-on-a-chip (SOC). FIG. 2 illustrates an ECC decoder 135 comprising a first register REG1, an error detection and correction part 135-1, and a second register REG2.

In operation, when it is desired to output chip information and/or security information for the SOC from a ROM where it is stored in the memory system of the SOC, the data and one or more parity bits are written into REG1. Then, error detection & correction part 135-1 checks the data and if the data has an error, corrects the data error(s) with the one or more parity bits. Finally, error detection & correction part 135-1 outputs the correct chip information and/or security information for the SOC to REG2.

It should also be understood that, in some embodiments, it may be the case that the one or more parity bits may be stored in a different ROM or memory device than the ROM that stores the chip information and/or security information for the SOC.

Figure 3:
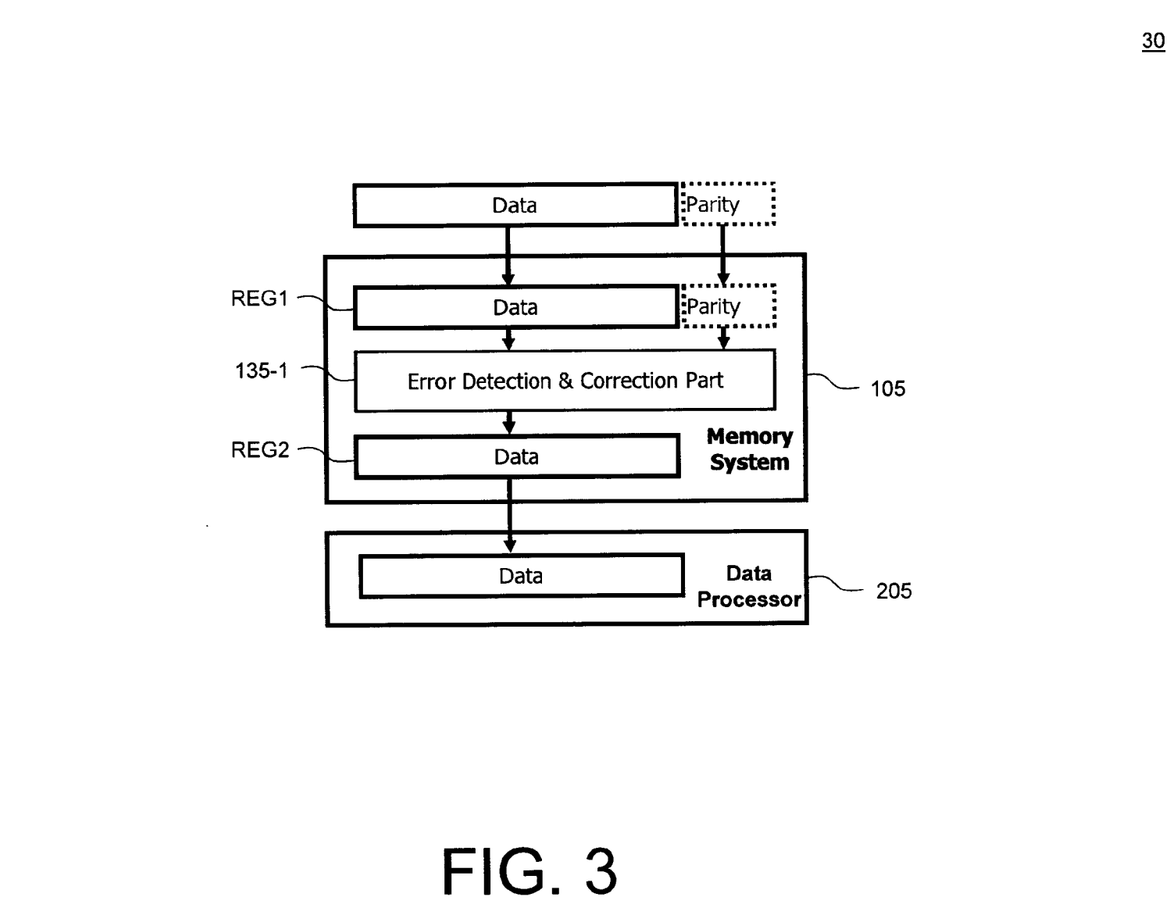
FIG. 3 illustrates a first embodiment of an ECC decoding arrangement for an SOC.

FIG. 3 illustrates a first embodiment of an ECC decoding arrangement 30 for an SOC. In the arrangement 30 illustrated in FIG. 3, ECC decoding operations for the chip information and/or security information for the SOC are performed using an ECC decoder 135 in a memory system 105 of the SOC and then the correct chip information and/or security information for the SOC is provided to a data processor 205 of the SOC.

Figure 4:
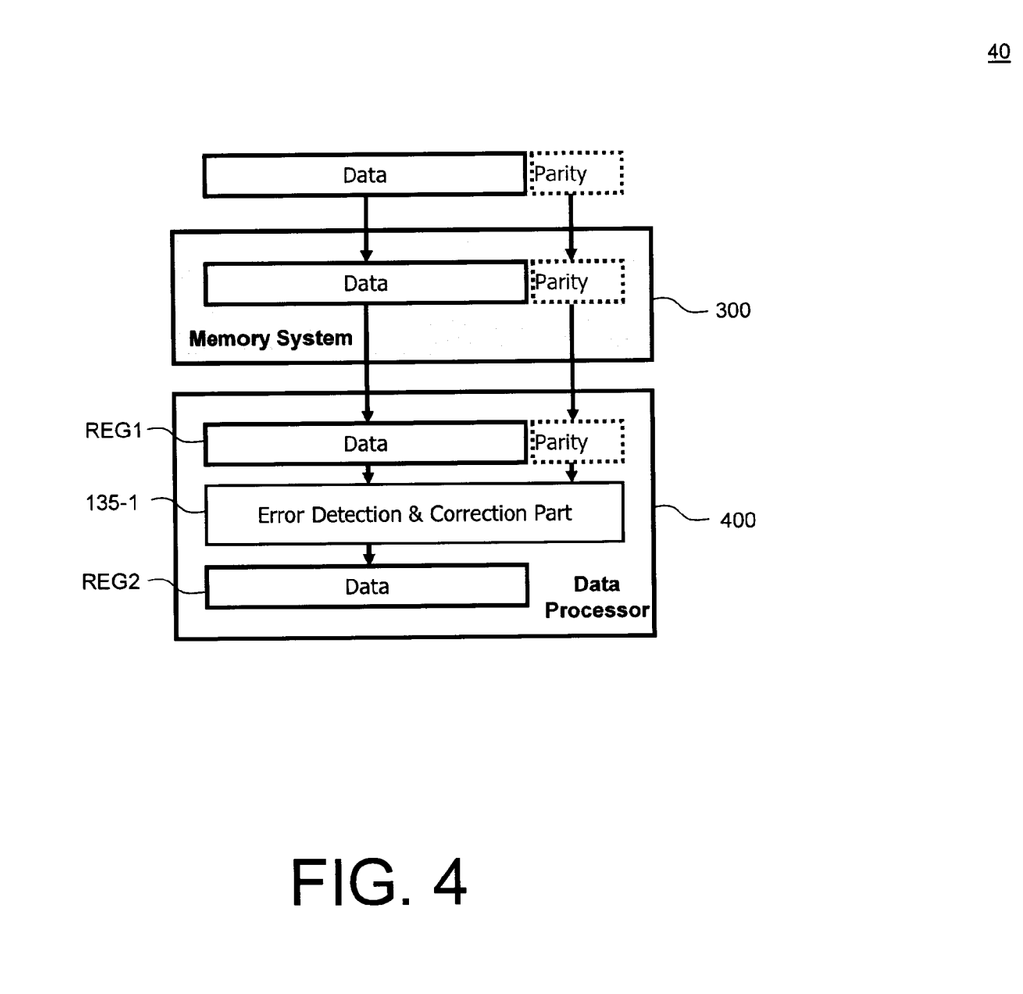
FIG. 4 illustrates a second embodiment of an ECC decoding arrangement for an SOC.

FIG. 4 illustrates a second embodiment of an ECC decoding arrangement 40 for an SOC. In the arrangement 40 illustrated in FIG. 4, ECC decoding operations for the chip information and/or security information for the SOC are performed using an ECC decoder 135 in a data processor 400 of the SOC. In this case, when a functional block in data processor 400 requests the chip information and/or security information for the SOC, the chip information and/or security information for the SOC is provided from the memory system 300 to the data processor 400 together with one or more parity bits. Then the ECC decoding operation for the chip information and/or security information for the SOC is performed in data processor 400 using the one or more parity bits to obtain the correct chip information and/or security information for the SOC.

Figure 5:
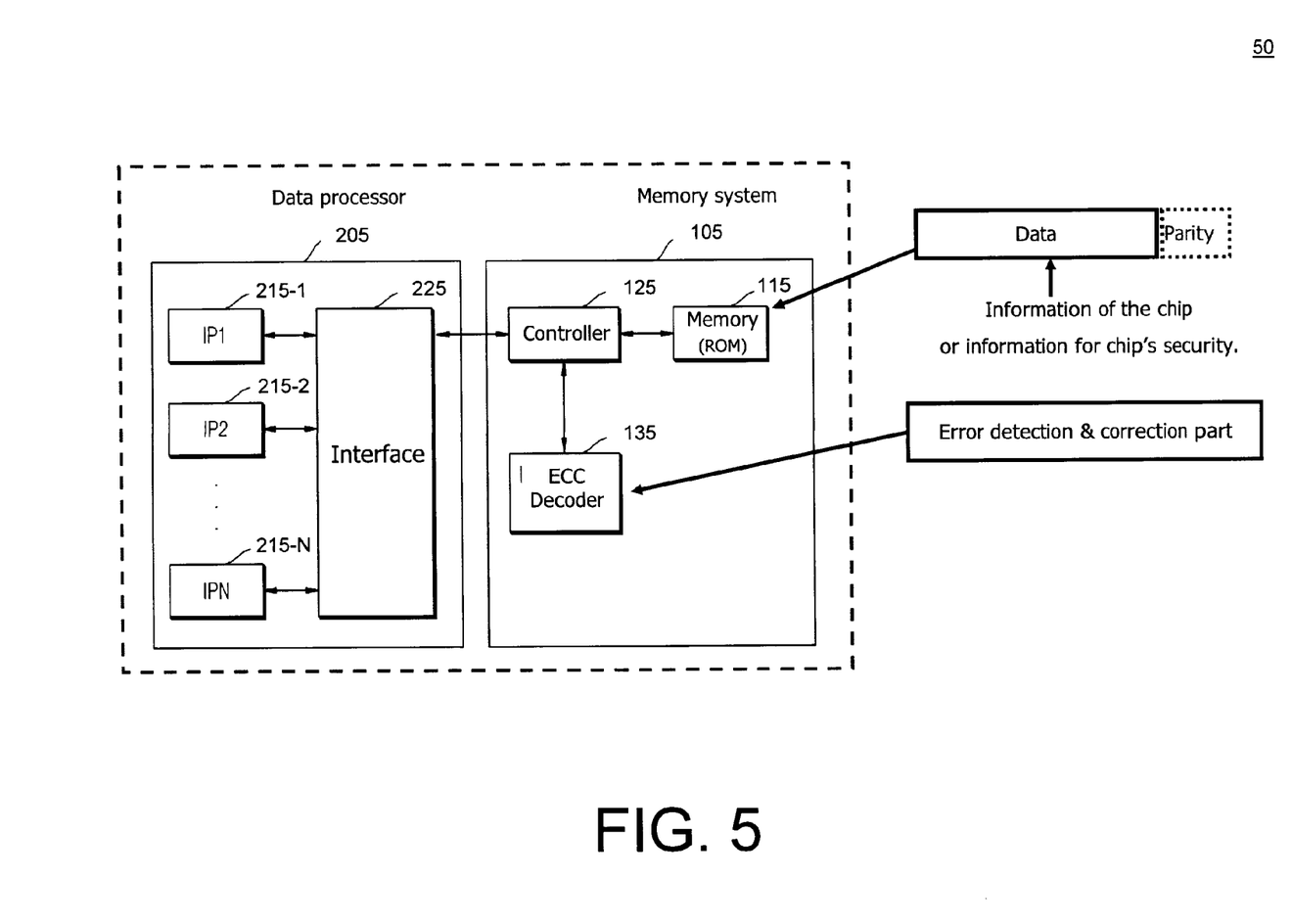
FIG. 5 illustrates a functional block diagram of a first embodiment of an SOC that is capable of performing an ECC decoding operation for chip information and/or security information for an SOC.

FIG. 5 illustrates a functional block diagram of a first embodiment of an SOC 50 that is capable of performing an ECC decoding operation for chip information and/or security information for the SOC. Beneficially, SOC 50 is configured to perform an ECC decoding operation for chip information and/or security information for SOC 50 in accordance with the embodiment explained above with respect to FIG. 3.

SOC 50 includes memory system 105 and data processor 205. Memory system 105 includes memory 115, memory controller 125, and error correction code (ECC) decoder 135. Data processor 205 includes a plurality of functional blocks 215-1~215-N and an interface 225 for communicating data between data processor 205 and memory system 105.

Memory 115 stores user data and/or application data generated or processed by data processor 205 and its functional blocks 215-1~215-N during operations of SOC 50, under control of memory controller 125. Beneficially, memory 115 includes random access memory for storing the user data and/or application data. Memory 115 also includes a ROM (e.g., a one-time programmable ROM, such as an E-Fuse ROM) storing chip information and/or security information for SOC 50. Chip information and/or security information may include a variety of data, including for example, a chip identification number, a chip version number, a chip security code, etc. Chip information and security information for SOC 50 should be distinguished from user data or application data generated and/or processed by data processor 205 and its functional blocks 215-1~215-N during operations of SOC 50.

Beneficially, the ROM in memory 115 also stores one or more parity bits for the chip information and/or security information for SOC 50. It should also be understood that, in some embodiments, it may be the case that the one or more parity bits may be stored in a different ROM or memory device than the ROM that stores the chip information and/or security information for SOC 50.

ECC decoder 135 performs an ECC decoding operation for the chip information and/or security information for SOC 50, using the parity bit(s), to produce corrected chip information and/or security information for SOC 50. Memory controller 125 may then communicate corrected chip information and/or security information for SOC 50 from memory system 105 to data processor 205 via interface 225.

Each of the functional blocks 215-1~215-N includes logic and/or data to perform an operation of SOC 50. Examples of functional blocks 215-1~215-N, which may be realized as IP cores, include: phase lock loops (PLLs), audio coders/decoders (CODECs), video CODECs, image CODECs, central processing units (CPUs), standard bus interfaces, memory controllers, data encrypters and decrypters, pseudorandom number generators, communication circuits, digital signal processors, etc.

Figure 6:
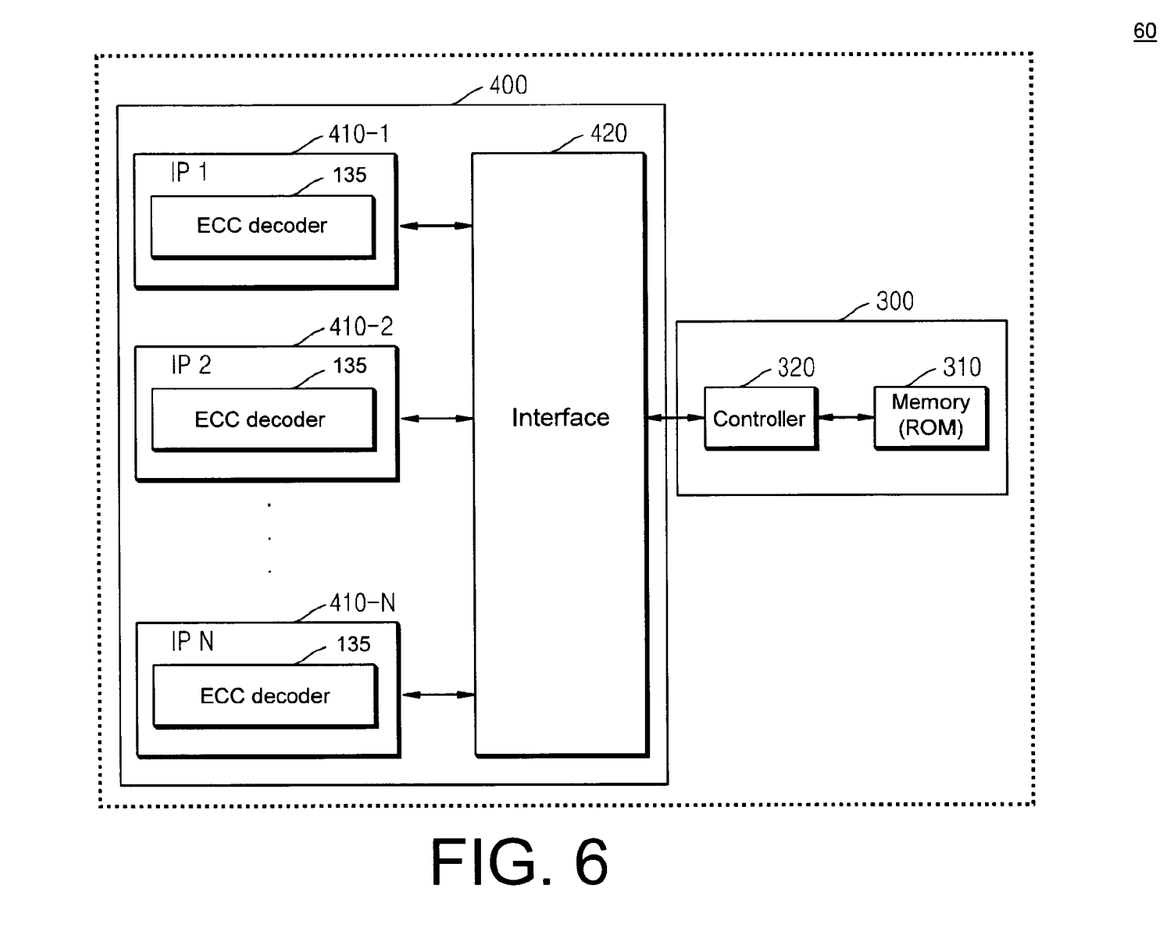
FIG. 6 illustrates a functional block diagram of a second embodiment of an SOC that is capable of performing an ECC decoding operation for chip information and/or security information for an SOC.

FIG. 6 illustrates a functional block diagram of a second embodiment of an SOC 60 that is capable of performing an ECC decoding operation for chip information and/or security information for the SOC. Beneficially, SOC 60 is configured to perform an ECC decoding operation for chip information and/or security information for SOC 60 in accordance with the embodiment explained above with respect to FIG. 4.

SOC 60 includes memory system 300 and data processor 400. Memory system 400 includes memory 310 and memory controller 320. Data processor 400 includes a plurality of functional blocks 410-1~410-N and an interface 420 for communicating data between data processor 400 and memory system 300.

Memory 310 stores user data and/or application data generated or processed by data processor 400 and its functional blocks 410-1~410-N during operations of SOC 60, under control of memory controller 320. Beneficially, memory 310 includes random access memory for storing the user data and/or application data. Memory 310 also includes a ROM (e.g., a one-time programmable ROM, such as an E-Fuse ROM) storing chip information and/or security information for SOC 60.

Beneficially, the ROM in memory 310 also stores one or more parity bits for the chip information and/or security information for SOC 60. It should also be understood that, in some embodiments, it may be the case that the one or more parity bits may be stored in a different ROM or memory device than the ROM that stores the chip information and/or security information for SOC 60.

Each of the functional blocks 410-1~410-N includes logic and/or data to perform an operation of SOC 60. Examples of functional blocks 410-1~410-N, which may be realized as IP cores, include: phase lock loops (PLLs), audio coders/decoders (CODECs), video CODECs, image CODECs, central processing units (CPUs), standard bus interfaces, memory controllers, data encrypters and decrypters, pseudorandom number generators, communication circuits, digital signal processors, etc.

Each of the functional blocks 410-1~410-N also includes an ECC decoder 135. ECC decoder 135 performs an ECC decoding operation for the chip information and/or security information for SOC 60, using the parity bit(s), to produce corrected chip information and/or security information for the corresponding functional block.

In operation, when a functional block 410-1~410-N requests the chip information and/or security information for SOC 60, memory controller 320 retrieves the chip information and/or security information for SOC 60 from the ROM in memory 310, together with the corresponding parity bit(s), and communicates the data and parity bits from memory system 300 to data processor 400 via interface 420. Then ECC decoder 135 in the requesting functional block performs an ECC decoding operation for the chip information and/or security information for SOC 60, using the parity bit(s), to produce corrected chip information and/or security information for SOC 60.

Figure 7:
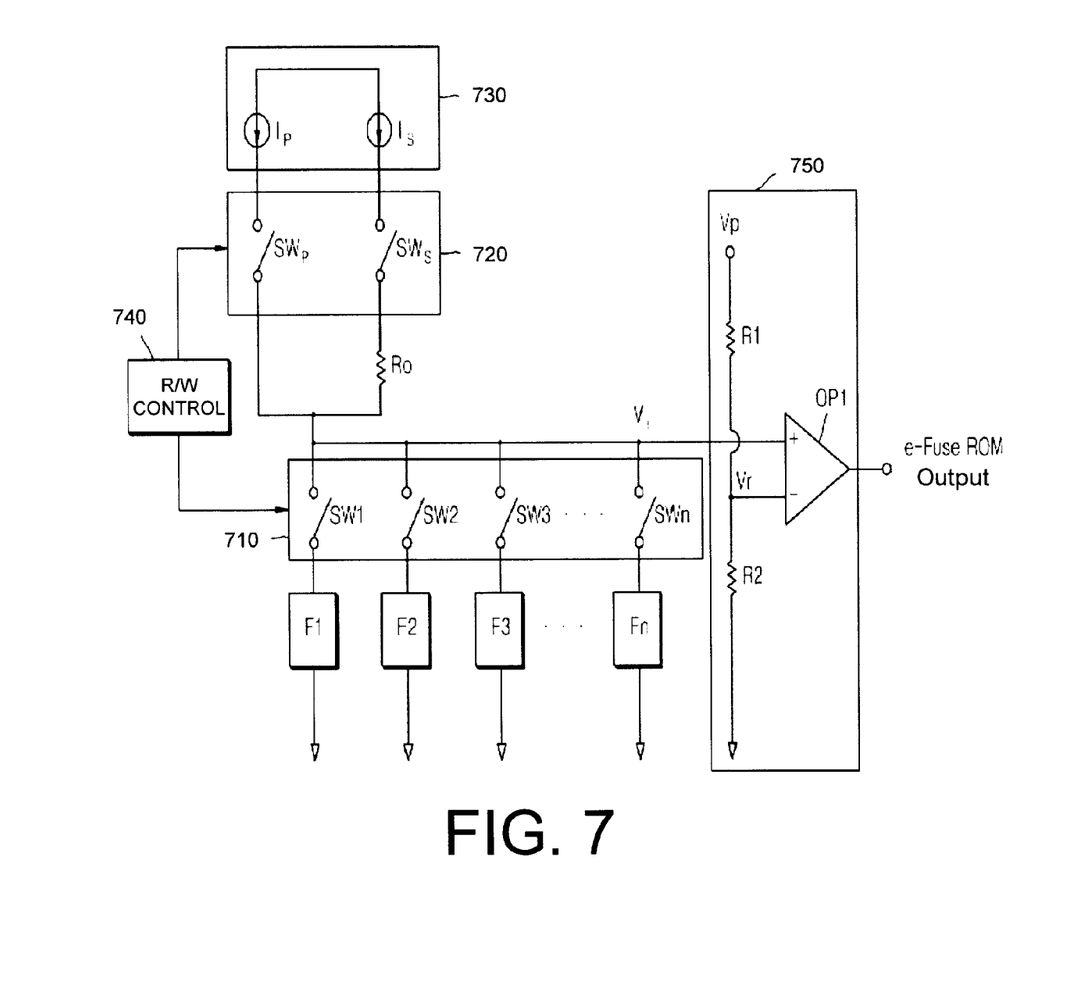
FIG. 7 illustrates elements of one embodiment of a memory device for storing chip information and/or security information for an SOC.

FIG. 7 illustrates elements of one embodiment of a memory device 70 for storing chip information and/or security information for an SOC. In particular, FIG. 7 illustrates an embodiment where memory device 70 comprises an E-Fuse ROM.

Memory device 70 includes a plurality of fuses F1~Fn, 1st switching blocks 710, 2nd switching blocks 720, power supply block 730, read/write control block 740, comparator 750, and a resistance Ro.

Fuses F1~Fn each correspond to a bit in memory device 70. Fuses F1~Fn are each configured to provide a low resistance when programmed with a low current which is less than a predetermined value, or to provide a high resistance when programmed with a large current over the predetermined value.

The power supply block 730 includes a first power supply source Ip which supplies a large current to a fuse for changing the resistance value of the fuse, and the power supply source Is which supplies a small current to the fuse for almost no change in resistance value of the fuse. In other words, power supply Ip is the programming current, and power supply Is is the reading current for memory device 70.

When programming memory device 70, the programming current is either supplied, or not supplied, to each fuse which corresponds to each bit, so that a logical value "0" or "1" is programmed into the fuse.

More specifically, in a programming mode for memory device 70, read/write control block 740 generates a signal to connect the switch SWp (i.e., turn it on) in second switching block 720, and generates a signal to disconnect the switch SWs (i.e., turn it off) in second switching block 720. Therefore, in the programming mode, power supply source Ip supplies the programming current to the switching block 710.

While the switch SWp is turned on, read/write control block 740 programs the logical value into the fuses F1~Fn to control the switches SW1~SWn in the switching block 710.

For example, to program the fuse F1 to have a logical value "1," the switch SW1 is turned "on" to connect the power supply source Ip supply current to the fuse F1, which in turn changes the resistance value of the fuse F1 to a high value.

In contrast, to program the fuse F2 to have a logical value "0," the switch SW2 is turned "off" to disconnect the power supply source Ip supply current from the fuse F2. Accordingly, power supply source Ip does not supply current to the fuse F2 and fuse F2 preserves the low resistance value of its initial state.

By this method, fuses F1~Fn of memory device 70 can be programmed from the 1st bit to the Nth-bit.

During a reading operation for memory device 70, read/write control block 740 generates a signal to connect the switch SWs (i.e., turn it on) in second switching block 720, and a signal to disconnect the switch SWp (i.e., turn it off) in second switching block 720. Therefore, in the read mode, power supply source Is supplies current to the switching block 710.

While the switch SWs is turned on, read/write control block 740 generates and supplies a signal to the fuses F1~Fn to connect the switches SW1~SWn in the switching block 710.

While the switch SWs is turned on, SW1 is turned on and the power supply source Is supplies current to the fuse F1 via resistance Ro. If the fuse F1 is programmed with a logical "1", then the fuse F1's resistance value is greater than the resistance Ro, so the relative voltage Vi produced by fuse F1 is greater than the reference voltage (Vr) of the comparator 750. Therefore, the output value of comparator 750 is a "1." Then, while the switch SWs is turned on, SW2 is turned on and the power supply source Is supplies current to the fuse F2 via resistance Ro. If the fuse F2 is programmed with a logical "0", then the fuse F2's resistance value is less than the resistance Ro, so the relative voltage Vi produced by fuse F1 is less than the reference voltage (Vr) of the comparator 750. Therefore, the output value of comparator 750 is a "0."

In the example, memory device 70 has a single column fuses/bits, but it is also possible to layout fuses in a matrix and, and fuses can be selected for programming or reading by supplying appropriate signals to the columns and rows of the matrix.

Figure 8:
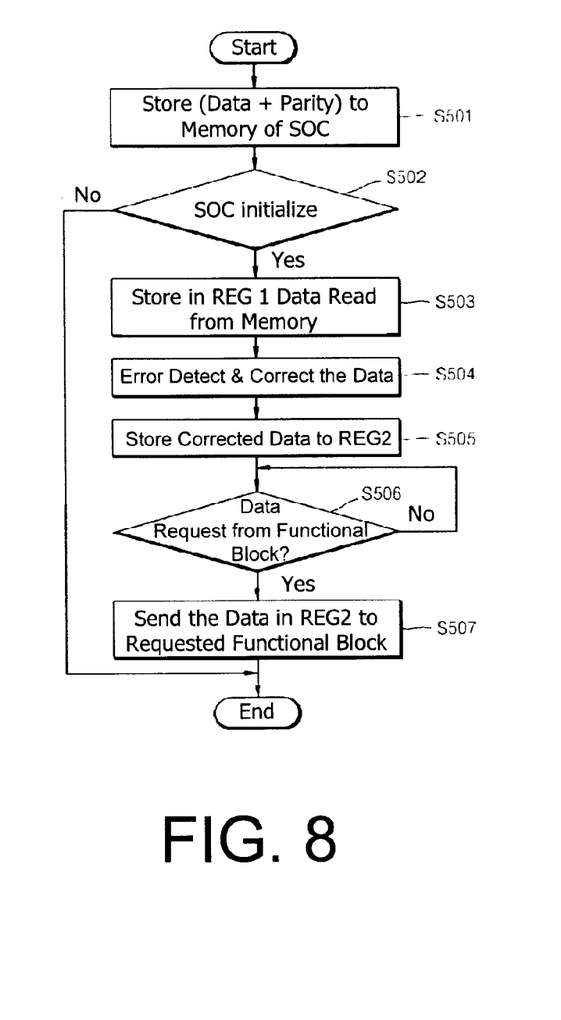
FIG. 8 shows a flowchart of a first embodiment of a method of processing chip information and/or security information for an SOC.

FIG. 8 shows a flowchart of a first embodiment of a method 80 of processing chip information and/or security information for an SOC.

In a first step S501, data comprising at least one of chip information and security information for the SOC, and one or more parity bits for error detection and correction, are stored in memory of a SOC in the process of SOC manufacture. The memory comprises a programmable ROM. Beneficially, the memory comprises an E-Fuse ROM. Instead of an E-Fuse ROM, another type of one time programmable ROM may be employed.

In a step S502, after the chip information and/or security information for the SOC is programmed in the chip manufacturing process, a check is made as to whether or not the SOC is to be initialized. SOC initialization is performed every time when power is supplied to the chip after chip's power had been off In a step S503, whenever the SOC is to be initialized, the chip information and/or security information for the SOC and the corresponding parity bit(s) is read from the memory and is stored temporary in the register REG1.

In a step S504, an error detection and correction part detects and corrects any errors in the chip information and/or security information for the SOC using the parity bit(s) in REG1. The error detection & correction process is related to the ECC encoding process in step S501.

In a step S505, the corrected chip information and/or security information for the SOC is stored in the register REG2.

In a step S506, a check is performed to determine whether there is a request from a functional block of the SOC for the chip information and/or security information for the SOC when the memory is in a standby status.

In a step S507, if a functional block requests the chip information and/or security information for the SOC, then the corrected data in register REG2 is sent to the functional block which requests the data.

Figure 9:
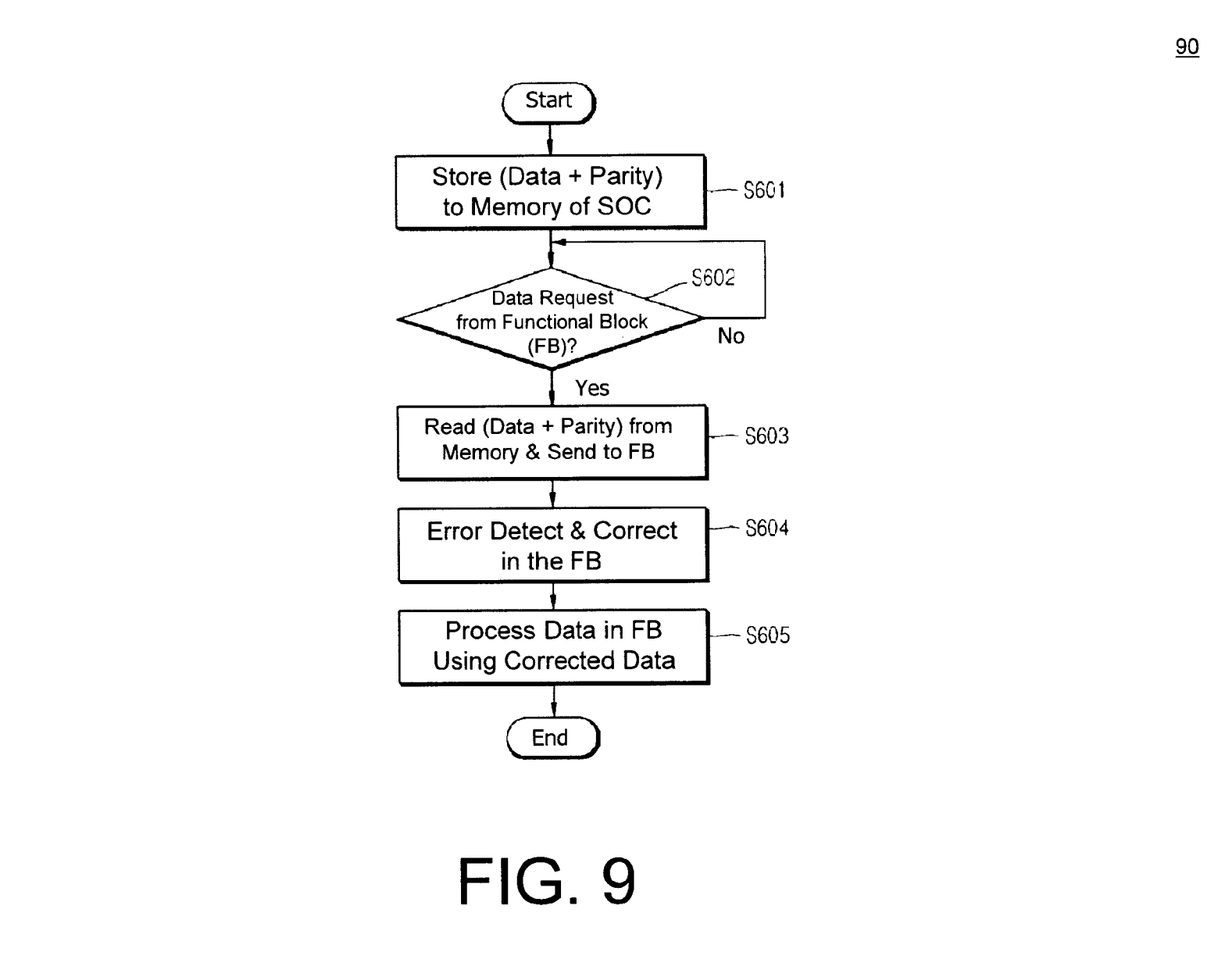
FIG. 9 shows a flowchart of a second embodiment of a method of processing chip information and/or security information for an SOC.

FIG. 9 shows a flowchart of a second embodiment of a method 90 of processing chip information and/or security information for an SOC.

In a first step S601, data comprising at least one of chip information and security information for the SOC, and one or more parity bits for error detection and correction, are stored in memory (e.g., an E-Fuse ROM) of a SOC in the process of SOC manufacture.

In a step S602, a check performed to determine if there is a request from a functional block of the SOC for data comprising chip information and/or security information for the SOC.

In a step S603, after receiving a request from a functional block of the SOC for data comprising chip information and/or security information for the SOC, the data and corresponding parity bit(s) stored in the memory of the SOC is sent to the functional block requesting the data.

In a step S604, an error detection and correction part in the functional block detects and corrects any errors in the chip information and/or security information for the SOC using the parity bit(s).

In a step S605, the functional block performs a data processing operation using the corrected chip information and/or security information for the SOC.

While preferred embodiments are disclosed herein, many variations are possible which remain within the concept and scope of the claims. Such variations would become clear to one of ordinary skill in the art after inspection of the specification, drawings and claims herein. The claims therefore are not to be restricted except within the spirit and scope of the appended claims.

What is claimed is:

1. A method, comprising:
in a system-on-a-chip (SOC) comprising a data processor including a functional block and a memory system including a register, storing in a read only memory (ROM) of the SOC first data comprising at least one of chip information and security information for the SOC, and one or more parity bits derived from the first data; and then,
for every initialization of the SOC following the storing of the first data and the one or more parity bits in the ROM, reading the first data and the one or more parity bits from the ROM, detecting and correcting errors in the first data using the one or more parity bits to generate corrected first data, and then storing the corrected first data in the register; and then,
upon receiving a request from the functional block, providing the corrected first data from the register to the data processor.

2. The method of claim 1, wherein the memory system further includes an error correction code (ECC) decoder that receives the first data and the one or more parity bits and detects and corrects the errors in the first data using the one or more parity bits.

3. The method of claim 1, wherein the SOC includes:
the memory system comprising the ROM, random access memory, and a memory controller; and
the data processor comprising the functional block that communicates data with the memory system, the function block including an error correction code (ECC) decoder, and
wherein the memory controller outputs the first data and the one or more parity bits to the functional block, and
wherein the ECC decoder of the function block receives the first data and the one or more parity bits and detects and corrects the errors in the first data using the one or more parity bits.

4. The method of claim 1, wherein the functional block includes a plurality of functional blocks, and the SOC includes:
the memory system comprising the ROM, random access memory, and a memory controller; and
the data processor comprising the plurality of functional blocks and an interface that communicates data between the plurality of functional blocks and the memory system, the interface including an error correction code (ECC) decoder, and
wherein the memory controller outputs the first data and the one or more parity bits to the interface,
wherein the ECC decoder of the interface receives the first data and the one or more parity bits and detects and corrects the errors in the first data using the one or more parity bits.

5. The method of claim 1, wherein the ROM comprises a plurality of electronic fuses that store the first data and one or more parity bits.

6. The method of claim 5, wherein reading the first data and one or more parity bits from the ROM comprises:
applying a second current, less than the first current, to each of the plurality of electronic fuses to determine a voltage produced thereby;
comparing the voltage produced by each electronic fuse to a reference voltage; and
determining a logic value for each electronic fuse based on the comparison between the voltage produced the electronic fuse and the reference voltage.

7. For a system-on-a-chip (SOC) comprising a memory system and a data processor, the memory system including random access memory, a memory controller, and an error correction code (ECC) decoder, and the data processor including at least one functional block that communicates data with the memory system via the memory controller, a method comprising:
during manufacture of the SOC, storing in a read only memory (ROM) of the memory system first data comprising at least one of chip information and security data for the SOC, and storing in the ROM one or more parity bits for the first data;
for every initialization of the SOC following the storing of the first data and the one or more parity bits in the ROM, reading the first data and the one or more parity bits from the ROM;
writing the first data and the one or more parity bits into a first register in the memory system;
employing the ECC decoder in the memory system to detect and correct errors in the first data using the one or more parity bits to generate corrected first data;
writing the corrected first data into a second register in the memory system; and then,
upon receiving a request from the at least one functional block, communicating the corrected first data from the memory system to the data processor.

8. The method of claim 7, wherein the ROM comprises a plurality of electronic fuses that store the first data and one or more parity bits.

9. The method of claim 8, wherein reading the first data and one or more parity bits from the ROM comprises:
applying a second current, less than the first current, to each of the plurality of electronic fuses to determine a voltage produced thereby;
comparing the voltage produced by each electronic fuse to a reference voltage; and
determining a logic value for each electronic fuse based on the comparison between the voltage produced the electronic fuse and the reference voltage.

* * * * *